US009952595B2

(12) United States Patent
Arbuckle et al.

(10) Patent No.: US 9,952,595 B2
(45) Date of Patent: Apr. 24, 2018

(54) VESSEL MANEUVERING METHODS AND SYSTEMS

(71) Applicant: Brunswick Corporation, Lake Forest, IL (US)

(72) Inventors: Jason S. Arbuckle, Horicon, WI (US); Thomas S. Kirchhoff, Fond Du Lac, WI (US); Michael J. Lemancik, Fond Du Lac, WI (US); Walter B. Ross, Fond Du Lac, WI (US); Robert M. Hackbarth, Neenah, WI (US); Mark W. Henker, Fond Du Lac, WI (US); Steven L. Van Camp, Cascade, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/416,318

(22) Filed: Jan. 26, 2017

(65) Prior Publication Data

US 2017/0255200 A1  Sep. 7, 2017

Related U.S. Application Data

(60) Provisional application No. 62/301,887, filed on Mar. 1, 2016.

(51) Int. Cl.
| | |
|---|---|
| *G05D 1/02* | (2006.01) |
| *B63H 21/21* | (2006.01) |
| *B63H 25/04* | (2006.01) |

(52) U.S. Cl.
CPC ........... *G05D 1/0206* (2013.01); *B63H 21/21* (2013.01); *B63H 25/04* (2013.01);
(Continued)

(58) Field of Classification Search
CPC ...... G05D 1/0206; B63H 21/21; B63H 25/04; B63H 2021/216; B63H 2025/045; B63B 2213/02
(Continued)

(56) References Cited

U.S. PATENT DOCUMENTS

| | | | |
|---|---|---|---|
| 3,688,252 | A | 8/1972 | Thompson |
| 3,715,571 | A | 2/1973 | Braddon |

(Continued)

FOREIGN PATENT DOCUMENTS

| | | |
|---|---|---|
| EP | 0816962 A1 | 7/1998 |
| EP | 2161542 A1 | 3/2010 |

(Continued)

OTHER PUBLICATIONS

Ward et al., "Method and System for Close Proximity Collision Detection", U.S. Appl. No. 14/807,217, filed Jul. 23, 2015.
(Continued)

*Primary Examiner* — Marthe Y Marc-Coleman
(74) *Attorney, Agent, or Firm* — Andrus Intellectual Property Law, LLP (57) ABSTRACT

A method for maneuvering a marine vessel powered by a propulsion system includes accepting inputs to an electronic navigation device and generating a desired track based on the inputs. The desired track includes a series of waypoints, each waypoint in the series of waypoints being associated with a respective heading. The method also includes sending position and orientation information corresponding to each waypoint and its associated heading to a control module. Based on the position and orientation information, the control module generates steering and thrust commands that are required to maneuver the marine vessel from a current waypoint and heading in the series to a following waypoint and heading in the series. According to the steering and
(Continued)

thrust commands, the propulsion system thereafter propels the marine vessel along the desired track to each waypoint and its associated heading in succession. A corresponding system is also disclosed.

18 Claims, 4 Drawing Sheets

(52) U.S. Cl.
CPC .... *B63B 2213/02* (2013.01); *B63H 2021/216* (2013.01); *B63H 2025/045* (2013.01)

(58) Field of Classification Search
USPC .............................. 701/21, 468, 23; 318/588
See application file for complete search history.

(56) References Cited

U.S. PATENT DOCUMENTS

| | | | |
|---|---|---|---|
| 3,771,483 A | 11/1973 | Spencer | |
| 4,253,149 A | 2/1981 | Cunningham et al. | |
| 4,428,052 A | 1/1984 | Robinson et al. | |
| 4,513,378 A | 4/1985 | Antkowiak | |
| 4,939,661 A | 7/1990 | Barker et al. | |
| 4,975,709 A | 12/1990 | Koike | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,736,962 A | 4/1998 | Tendler | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,308,651 B2 | 10/2001 | McKenney et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,678,589 B2 | 1/2004 | Robertson et al. | |
| 6,848,382 B2 | 2/2005 | Bekker | |
| 6,995,527 B2 | 2/2006 | DePasqua | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,727,036 B1 | 6/2010 | Poorman et al. | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,417,399 B2 | 4/2013 | Arbuckle et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,110,467 B2 | 8/2015 | Yuet et al. | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,248,898 B1 | 2/2016 | Kirchhoff et al. | |
| 9,359,057 B1 | 6/2016 | Andrasko et al. | |
| 9,377,780 B1 | 6/2016 | Arbuckle et al. | |
| 9,676,464 B2 | 6/2017 | Johnson et al. | |
| 2004/0221787 A1 | 11/2004 | McKenney et al. | |
| 2005/0170713 A1 | 8/2005 | Okuyama | |
| 2006/0089794 A1 | 4/2006 | DePasqua | |
| 2006/0116796 A1 | 6/2006 | Fossen et al. | |
| 2007/0017426 A1 | 1/2007 | Kaji et al. | |
| 2007/0032923 A1 | 2/2007 | Mossman et al. | |
| 2007/0162207 A1 | 7/2007 | Shimo et al. | |
| 2007/0178779 A1 | 8/2007 | Takada et al. | |
| 2007/0203623 A1 | 8/2007 | Saunders et al. | |
| 2007/0233389 A1 | 10/2007 | Stephens | |
| 2009/0037040 A1 | 2/2009 | Salmon et al. | |
| 2009/0171520 A1 | 7/2009 | Kaji | |
| 2009/0276148 A1 | 11/2009 | Ardvisson | |
| 2010/0109944 A1 | 5/2010 | Whitehead et al. | |
| 2011/0153126 A1* | 6/2011 | Arbuckle ............... | B63H 21/22 701/21 |
| 2012/0129410 A1 | 5/2012 | Tyers | |
| 2012/0130570 A1 | 5/2012 | Pease | |
| 2012/0248259 A1 | 10/2012 | Page et al. | |
| 2013/0080044 A1 | 3/2013 | Tyers et al. | |
| 2013/0297104 A1 | 11/2013 | Tyers et al. | |
| 2015/0089427 A1 | 3/2015 | Akuzawa | |
| 2015/0277442 A1 | 10/2015 | Ballou | |
| 2015/0346730 A1 | 12/2015 | Stephens et al. | |
| 2016/0016651 A1 | 1/2016 | Anderson et al. | |
| 2016/0101838 A1 | 4/2016 | Kojima | |
| 2016/0125739 A1 | 5/2016 | Stewart et al. | |
| 2016/0246300 A1 | 8/2016 | Langford-Wood | |
| 2016/0252907 A1 | 9/2016 | Parkinson | |
| 2016/0334792 A1 | 11/2016 | Jopling | |
| 2017/0205828 A1 | 7/2017 | Estabrook | |
| 2017/0205829 A1 | 7/2017 | Tyers | |
| 2017/0210449 A1 | 7/2017 | Frisbie et al. | |
| 2017/0255200 A1 | 9/2017 | Arbuckle et al. | |
| 2017/0277189 A1 | 9/2017 | Johnson et al. | |
| 2017/0349257 A1 | 12/2017 | Hara et al. | |
| 2017/0365175 A1 | 12/2017 | Harnett | |
| 2018/0015994 A1 | 1/2018 | Kishimoto et al. | |

FOREIGN PATENT DOCUMENTS

| | | |
|---|---|---|
| JP | 05-203638 A | 8/1993 |
| JP | 2926533 B2 | 7/1997 |
| JP | 11-129978 A | 5/1999 |
| JP | 2002173091 A | 6/2002 |
| JP | 2003276677 A | 10/2003 |
| JP | 200442884 A | 2/2004 |
| JP | 2004355105 A | 12/2004 |
| JP | 200546034 A | 2/2005 |
| JP | 2006137309 A | 6/2006 |
| JP | 2009-538782 A | 11/2009 |
| JP | 5042906 B2 | 7/2012 |
| JP | 2012528417 A | 11/2012 |
| JP | 5226355 B2 | 7/2013 |
| WO | 9205505 A1 | 4/1992 |

OTHER PUBLICATIONS

Poorman et al., "Multilayer Control System and Method for Controlling Movement of a Marine Vessel", U.S. Appl. No. 11/965,583, filed Dec. 27, 2007.

(56) References Cited

OTHER PUBLICATIONS

Andrasko et al., "System and Method for Controlling Handling of a Marine Vessel", U.S. Appl. No. 14/484,702, filed Sep. 12, 2014.
Extended European Search Report in corresponding EP Application No. 17020061.2 dated Jul. 3, 2017.
Japanese Office Action in corresponding JP Application No. 2017-036671 dated Jul. 4, 2017.

* cited by examiner

VESSEL MANEUVERING METHODS AND SYSTEMS

CROSS-REFERENCE TO RELATED APPLICATION

The present application claims the benefit of U.S. Provisional Application Ser. No. 62/301,887, filed on Mar. 1, 2016, which is hereby incorporated by reference.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various autopilot, station keeping, and waypoint tracking features and related system and method improvements include: U.S. Pat. Nos. 7,267,068; 7,561,886; 8,050,630; 8,417,399; 8,694,248; 8,777,681; 8,807,059; 8,924,054; 9,039,468; 9,132,903; 9,248,898; 9,377,780; and unpublished U.S. patent application Ser. Nos. 14/484,702, filed Sep. 12, 2014, and Ser. No. 14/807,217, filed Jul. 23, 2015. Each of these patents and applications is hereby incorporated by reference herein.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

A method for maneuvering a marine vessel powered by a propulsion system is disclosed. The method includes accepting inputs to an electronic navigation device and generating a desired track based on the inputs, wherein the desired track includes a series of waypoints, each waypoint in the series of waypoints being associated with a respective heading. The method also includes sending position and orientation information corresponding to each waypoint and its associated heading to a control module. Based on the position and orientation information, the control module generates steering and thrust commands that are required to maneuver the marine vessel from a current waypoint and heading in the series to a following waypoint and heading in the series. According to the steering and thrust commands, the propulsion system thereafter propels the marine vessel along the desired track to each waypoint and its associated heading in succession.

A navigational system for a marine vessel is provided according to another example of the present disclosure. The navigational system includes an electronic navigation device, a control module in signal communication with the electronic navigation device, and a vessel propulsion system in signal communication with the control module. The electronic navigation device generates a desired track including a series of waypoints, each waypoint in the series of waypoints being associated with a respective heading. The control module receives position and orientation information corresponding to each waypoint and its associated heading from the electronic navigation device. Based on the position and orientation information, the control module directs the vessel propulsion system to propel the marine vessel along the desired track to each waypoint and its associated heading in succession.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
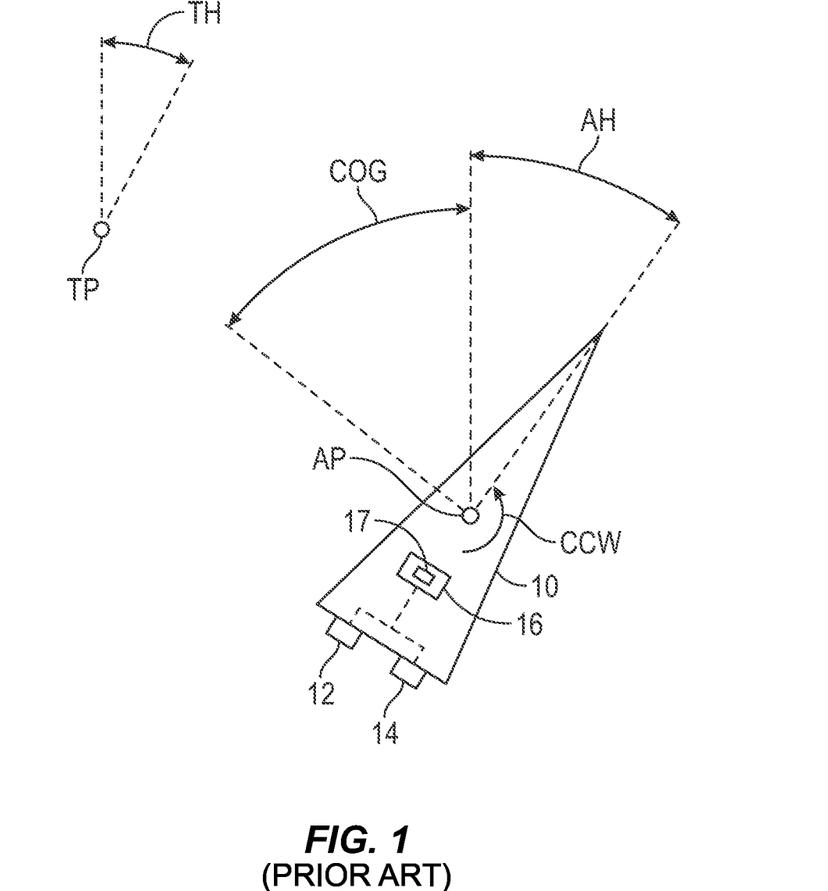
FIG. 1 is a schematic for purposes of illustrating a station keeping method.

Referring to FIG. 1, in a station keeping mode, a marine vessel 10 can be maintained in a single global position (defined by latitude and longitude) and at a predetermined heading by way of an algorithm that controls the vessel's propulsion devices 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. A control module 16 that controls thrust and angular orientation of the propulsion devices 12, 14 acts as a joystick and calculates left/right, fore/aft, and yaw commands required to drive the vessel's position error and heading error to zero. The control module 16 can control one or more propulsion devices 12, 14 to do so, which may be located at the rear of the vessel 10 such as with outboards or stern drives, under the vessel 10 such as with pod drives, and/or at the front, back, or sides of the vessel 10 such as with thrusters.

An example of the inputs to the control module's calculations is shown in FIG. 1. In this example, the actual global position (AP) of a preselected point on the vessel 10, as determined by a GPS receiver, is not equal to a setpoint target global position (TP), and thus the control module 16 will calculate a course over ground (COG) that the vessel 10 must travel to reach the target global position TP. Additionally, a setpoint target heading (TH) is 27 degrees from north, while the actual heading (AH) read from a compass or an inertial measurement unit (IMU) is 35.8 degrees. The control module 16 will therefore determine that a counterclockwise yaw movement (arrow CCW) of 8.8 degrees is required to return the vessel 10 to the target heading TH.

The control module 16 determines when and how much corrective action to take according to a three-dimensional (left/right, fore/aft, and yaw) proportional, integral, and derivative (PID) control algorithm performed by a feedback controller 17 of the control module 16. The integral term allows the control system to reject constant and slowly varying disturbances (e.g., current) while maintaining near zero position error. The proportional and derivative terms handle the quickly varying disturbances. The integral term is also considered to have memory and can take time to increase or decrease, especially if the disturbance forces grow. The PID feedback controller 17 computes a desired force in the forward/back and left/right directions with reference to the marine vessel 10, along with a desired yaw moment relative to the marine vessel 10, in order to null the error elements. The computed force and moment elements are then transmitted to the vessel propulsion system, which delivers the requested forces and moments by positioning the independently steerable propulsion devices 12, 14, controlling the power provided to the propellers of each device, and controlling the thrust vector directions of both devices. Such automatic correction of the position and heading of the marine vessel 10 can be achieved according to the principles described in U.S. Pat. No. 7,305,928, which was incorporated by reference herein above.

Besides station keeping, a marine vessel can be controlled in a waypoint tracking mode, as disclosed in U.S. Pat. No. 9,377,780, which was incorporated by reference above. In the waypoint tracking mode, the marine vessel 10 is automatically guided to a waypoint (e.g., a global position defined in terms of latitude and longitude) or to several waypoints along a track. To initiate waypoint tracking mode, for example, the operator of the marine vessel 10 may select a point or a track from a chart plotter and select waypoint tracking mode from the chart plotter or from a separate autopilot. The control module 16 then obtains a commanded course from the autopilot according to the information provided by the chart plotter. The control module 16 then automatically guides the marine vessel 10 to each waypoint along the track (or to the single selected waypoint) by providing steering and thrust commands to the propulsion devices 12, 14. For example, referring to FIG. 3, the points 301, 302, 303, 304, 305, 306, and 307 are waypoints in a track 300 defined by the solid line arrows. The course from waypoint 301 to waypoint 302 is along the solid line arrow connecting the two points. If the marine vessel 10 veers off this course, such as due to the effect of wind, waves, or the like, the control module 16 determines the corrective action needed to resume the commanded course so as to guide the marine vessel 10 back on track. The control module 16 provides steering and/or thrust commands to the propulsion devices 12, 14 to achieve such corrective action.

In the waypoint tracking mode, the control module 16 may use a course feedback signal (indicating an estimate of the course along which the marine vessel 10 is actually being propelled) to determine whether correction needs to be made to the actual course of the marine vessel 10 in order to maintain the commanded course. The feedback controller 17 of the control module 16 uses the course feedback signal to determine how and to what extent the propulsion devices 12, 14 must be steered (and/or provided with what thrust) in order to re-orient the marine vessel 10 to the commanded course. Such measurement and automatic correction of the course of the marine vessel 10 can be achieved according to the principles described in U.S. Pat. Nos. 9,039,468 and 9,377,780, the disclosures of which are hereby incorporated by reference in their entireties.

Currently, as described herein above, station keeping allows a vessel 10 to be electronically anchored at a single target position TP and a particular target heading TH. Waypoint tracking allows a vessel 10 to be automatically guided along a track 300 by traveling from one latitude/longitude coordinate to another. If features such as fish-following and fine waypoint tracking are available, both of which will be described herein below, the control module 16 will repeatedly be controlling the vessel 10 to a new position and/or heading while the given functionality is enabled. The following examples expand upon and combine the station keeping and waypoint tracking concepts in innovative ways to provide fish-finding and fine waypoint tracking maneuvers that were heretofore not available for larger vessels propelled by propulsion devices 12, 14 that use internal combustion engines for power. The following methods can be implemented on multi-engine vessels (see FIG. 1) or on single-engine vessels (see FIG. 2).

Figure 2:
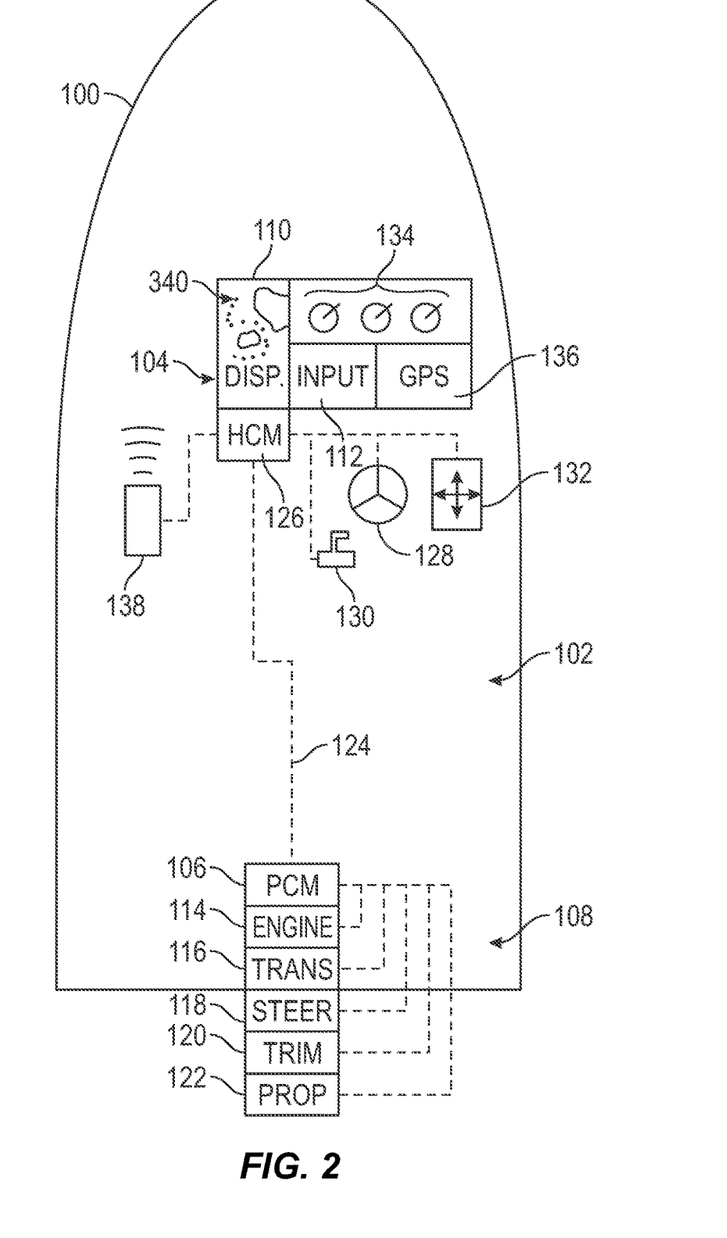
FIG. 2 is a schematic of one example of a marine vessel and a propulsion system according to the present disclosure.
Figure 3:
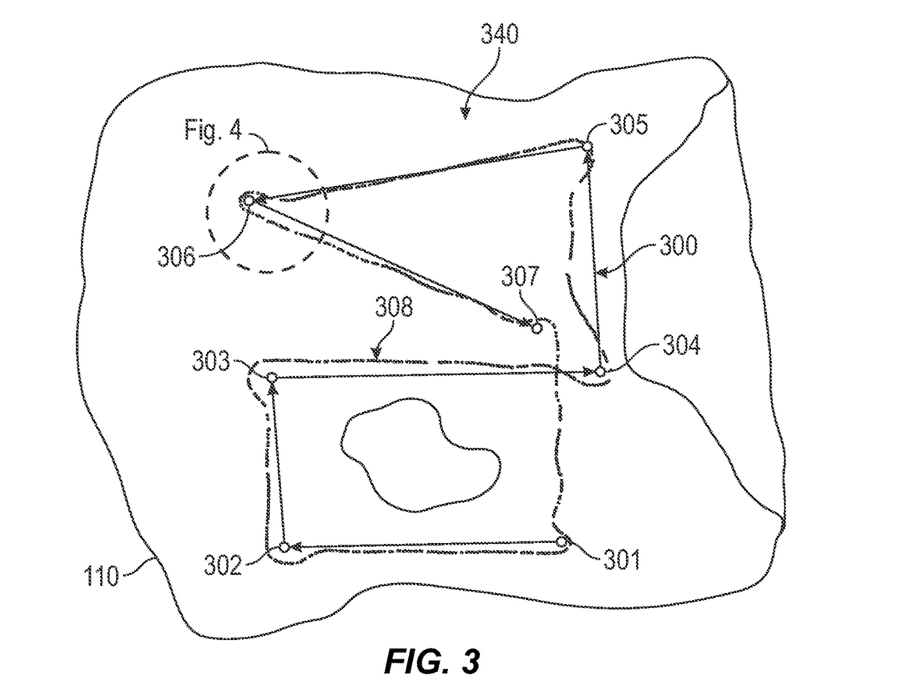
FIG. 3 is a schematic for purposes of illustrating waypoint tracking methods.

FIG. 2 illustrates another example of a marine vessel 100 and its navigational system 102, including an electronic navigation device 104 and a propulsion control module (PCM) 106 in signal communication with the electronic navigation device 104. The electronic navigation device 104 comprises a display screen 110 and user input means 112. The user input means 112 could be one or more of a touch sensitive display screen (which can be the same as the display screen 110), a keyboard, a mouse, a track ball, a button or buttons, a stylus, a smart device such as a smart phone or a tablet, a remote control, a voice recognition module, or any other known input means capable of converting an analog input or action to an electronic signal. The electronic navigation device 104 can, for instance, be a fish finder, a chart plotter, or a combined fish finder and chart plotter. Other electronic navigation devices provided with GPS capabilities or other location determination capabilities and/or fish finding capabilities or other object detection capabilities may be used.

The PCM 106 controls a vessel propulsion system 108, including an engine 114, transmission 116, steering actuator 118, trim actuator 120, and propeller 122. The vessel propulsion system 108 may alternatively comprise two or more propulsion devices, as shown at 12, 14 in FIG. 1, which may each have the components listed herein above, although such components are not shown. Returning to FIG. 2, the PCM 106 is in signal communication via a communication link 124 with the electronic navigation device 104, such as through a helm control module (HCM) 126. The HCM 126 is also in signal communication with a steering wheel 128, a throttle/shift lever 130, a joystick 132, and a number of gauges 134, located at or near a helm of the vessel 100. A global positioning system (GPS) receiver 136 is also provided as part of or in signal communication with the electronic navigation device 104.

The control modules (such as PCM 106 and HCM 126) are programmable and include a processing system and a storage system. The control modules can be located anywhere on the vessel 100 and/or located remote from the vessel 100 and can communicate with various components of the vessel 100 via peripheral interfaces and wired and/or wireless links, as will be explained further herein below. Although FIG. 2 shows two control modules 106, 126, the vessel 100 can include one combined control module, such as that shown at 16 in FIG. 1. Portions of the method disclosed herein below can be carried out by a single control module or by several separate control modules. For example, the system can have a control module 126 located at or near a helm of the vessel 100 and can also have control module(s) 106 located at or near each propulsion device. Either of the PCM 106 or the HCM 126 can be the control module that carries out the maneuvering method described in the present disclosure, or portions of the maneuvering method can be carried out separately on the PCM 106 or the HCM 126, which together can be the control module. The electronic navigation device 104 can be programmed to perform most of the calculations described herein below related to the speed at which the vessel 100 will navigate a track and whether the vessel 100 will rotate before or while it is changing geographical position, or the control module(s) 106, 126 can be programmed to perform these parts of the algorithm. The electronic navigation device 104 can provide commands to the control module(s) 106, 126 on its own initiative, or in response to a command from the control module(s) 106, 126.

In some examples, the control modules 106, 126 may include a computing system that includes a processing system, storage system, software, and input/output (I/O) interface for communicating with peripheral devices. The systems may be implemented in hardware and/or software that carries out a programmed set of instructions. For example, the processing system loads and executes software from the storage system, such as software programmed with a vessel maneuvering method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 106, 126 communicates with one or more components on the vessel 100 via its respective I/O interface and the communication link 124, which can be a wired or wireless link. In one example, the communication link 124 is a controller area network (CAN) bus, but other types of links could be used.

The provided description of the control module is conceptual and should be interpreted generally, as those skilled in the art will recognize many ways to implement such a control module. These include implementation using a digital microprocessor that receives input signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

Below, the maneuvering methods of the present disclosure will be described as being carried out by the HCM 126 so as to explain the system shown in FIG. 2, although it should be understood that the references thereto apply equally to the PCM 106 or to a single vessel control module 16, either of which can carry out a portion or a whole of the maneuvering methods described herein.

Figure 4:
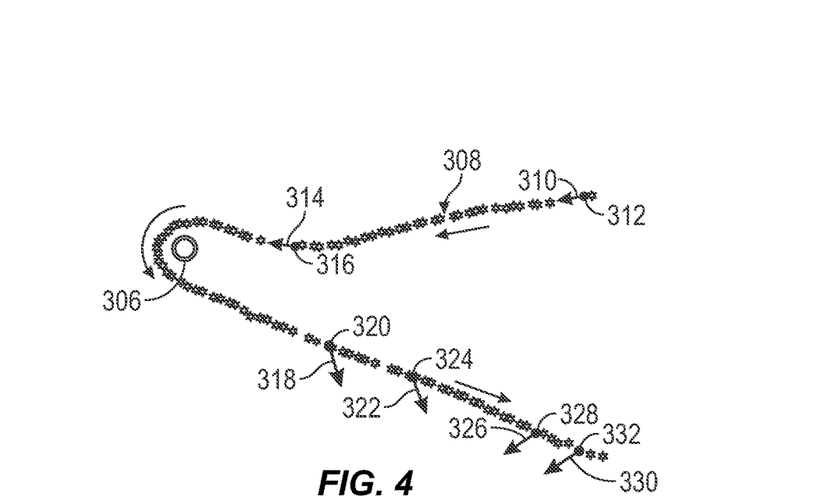
FIG. 4 is a close-up of the area circled in FIG. 3.

Referring to FIG. 3, in the present example, the electronic navigation device 104 generates a desired track 308 including a series of waypoints as shown by the dotted line (wherein each dot is a waypoint) based on inputs to be described herein below. As shown in FIG. 4, each waypoint in the series of waypoints is associated with a respective heading. Not all desired headings are shown herein for purposes of clarity, but the headings 310, 314, 318, 322, 326, and 330 (associated with the exemplary waypoints 312, 316, 320, 324, 328, and 332) are shown for purposes of further explanation. For example, the waypoint 312 is associated with the heading 310; the waypoint 316 is associated with the heading 314; the waypoint 320 is associated with the heading 318; etc. The control module 126 receives position and orientation information corresponding to each waypoint and its associated heading from the electronic navigation device 104. Based on the position and orientation information, the control module 126 directs the vessel propulsion system 108 to propel the marine vessel 100 along the desired track 308 to each waypoint and its associated heading in succession. The present maneuvering algorithms provide control over each of vessel heading, vessel orientation relative to vessel course over ground, and vessel global position while waypoint tracking. The present algorithms allow the user to modify the anchor setpoint for the vessel via the electronic navigation device 104 to provide very fine adjustments in position and heading so that complex patterns can be followed, such as a fishing pattern, a short route, or a tight route (e.g., along a reef or trench).

In one example, the control module 126 can be communicatively connected with a device such as a radar, sonar, traducer-based, radio-based or other type of fish finding device in order to control the vessel to follow a single fish or a school of fish. For example, FIG. 2 shows a transducer assembly 138 for detecting an aquatic life form, wherein the transducer assembly 138 is in signal communication with the electronic navigation device 104. The electronic navigation device 104 can generate a desired track based on the location of the detected aquatic life form. For example, a specific fish can be used as a target, or the center of mass of a school of fish can be used as the target. The operator of the vessel 100 can specify the target by selecting it via the user input means 112 when the target appears on the display screen 110 of the electronic navigation device 104. In one example, based on a detected direction of movement of the target, the electronic navigation device 104 will set a waypoint in the detected direction of travel. The waypoint can be set at a short distance away, within which it is likely the same target can again be found with the transducer assembly 138. In another example, the transducer assembly 138 continually tracks the position of the target, and this information is transmitted to the electronic navigation device 104, which sends the new position of the target as the next waypoint to the control module 126. Either of these methods can continue for as long as desired, thereby creating a track 308 along which the vessel 100 follows the target.

The operator of the vessel 100 can choose by way of the user input means 112 to maintain the vessel 100 at any orientation with respect to the target, such as directly above it, 20 meters to the east, etc. As wind or current move the boat, or as the fish themselves move, the vessel 100 is automatically controlled to maintain its position relative to the fish. The operator could also select a deadband for control, wherein the vessel 100 would not change position until the target fish or school of fish has moved beyond a particular threshold from the vessel 100. The operator may also select the heading he wishes to maintain, which may or may not be the same as the direction of travel between waypoints/fish locations.

The fish-following algorithm could end automatically in response to detection of shallow water, a shoreline, or other obstruction by another sensor such as a radar or a sonar on the vessel 100. The fish-following algorithm could also end in response to cancellation by the operator via the user input means 112. The vessel 100 could be maintained at the position and heading it is currently at when the fish-finding algorithm ends.

In another example, the navigational system 102 can be provided with fine waypoint tracking control, including heading control, by way of the electronic navigation device 104, which may generate a desired track 308 based on a desired route on a navigational map 340 displayed on the display screen 110. For example, the operator can choose an existing route saved in the memory of the electronic navigation device 104 or can download a list of waypoints corresponding to the desired route from the internet or an external drive or disk, which route can be overlaid on the navigational map 340 and displayed on the display screen 110. Alternatively, the user can draw a desired route on the navigational map 340 shown on the display screen 110, for example via user input means 112 such as a touch screen interface activated by the operator's finger and/or a stylus or such as a mouse that controls a cursor on the display screen 110. The electronic navigation device 104 will then set the route, however it is entered, as the desired track 308.

The operator can choose to navigate the desired track 308 in any direction or orientation with respect to the track, including in forward or in a left-right direction. The operator can specify headings to be associated with each waypoint in the desired track 308 via the user input means 112, such as via a keyboard, mouse, or buttons that allow the operator to select each waypoint or groups of waypoints in turn, either from the map 340 or from a list of waypoints presented on the display screen 110, and to assign a heading to that waypoint or group of waypoints. Alternatively, the operator could select a given waypoint using a stylus or finger, and then swipe across the interactive display screen 110 in the direction of the desired heading.

The electronic navigation device 104 may update the virtual anchor point as the vessel 100 arrives at each new waypoint along the track 308, such as by providing a stream of discrete anchor points to the control module 126 over time. The control module 126 will cause the vessel 100 to move to each new anchor point as it is updated by the electronic navigation device 104. The electronic navigation device 104 can transmit the anchor point based on a given time interval, a particular distance from the following or preceding waypoint, etc. so that the speed of the route can be controlled with great precision. In one example, the user input means 112 allows for user control over a speed at which the marine vessel 100 is propelled along the desired track 308. For example, the operator can choose to send the position and orientation information corresponding to each waypoint and its associated heading to the control module 126 in succession at a predetermined time interval, which time interval may be chosen by the operator and may be a measured in seconds or defined by a bit rate. In another example, the operator may choose to have the electronic navigation device 104 send the position and orientation information for the following waypoint and heading only after reaching the current waypoint and heading. In yet another example, the operator may choose to have the electronic navigation device 104 send the position and orientation information for the following waypoint and heading only after coming within a given distance of the current waypoint and heading. In other examples, the electronic navigation device 104 may send the position and orientation information in chunks, such as for five waypoints at a time. In other examples, the electronic navigation device 104 may send all of the position and orientation information for all waypoints in the track 308 at once, and the control module 126 can independently determine at what speed to travel. For example, the speed at which to travel along the track 308 may be determined by a position of the joystick 132 or of the throttle/shift lever 130. In another example, the vessel speed or a prescribed thrust may be predetermined based on code saved in the memory of the control module 126.

The operator may also choose to maintain the marine vessel 100 at a given waypoint in the series of waypoints and at the heading associated with the given waypoint for a predetermined period of time. For example, the navigational system 102 can be used to progress along a track 308, pause for a certain period of time at a particular waypoint 312, and then continue progression. The operator could choose to remain (i.e., to electronically anchor) at one or all of the waypoints for a predetermined period of time before continuing to the next waypoint in the track. This feature could also be a default according to the software code in the control module 126.

As shown in FIG. 4, each waypoint could be associated with a particular heading, which need not be in the direction the vessel 100 is traveling. In other words, the heading may be independent of the path between the two waypoints, such that the heading associated with a following waypoint is not equal to a bearing between the current waypoint and the following waypoint. For example, the headings 318, 322 associated with waypoints 320 and 324 are rotated clockwise with respect to the course/bearing between the waypoints 320, 324. The desired heading need not even be forward-directed. For example, the heading (i.e., direction of the bow of the vessel 100) is backwards with respect to the course between waypoints 328 and 332, such that headings 326, 330 are rotated more than 90 degrees clockwise from the course between the two. In other examples, the marine vessel 100 could be programmed to travel sideways, with its port or starboard side perpendicular to the course between two waypoints, or in reverse, such that the bow of the vessel 100 is pointed toward the previous waypoint and the stern leads toward the following waypoint.

The switch from one heading to another may also be accomplished in various ways. In one example, the marine vessel 100 is propelled to a given waypoint in the series of waypoints while simultaneously being rotated to the heading associated with the given waypoint. For example, ignoring the waypoints between waypoint 324 and waypoint 328, the marine vessel 100 would be rotated from heading 322 to heading 326 while travelling from waypoint 324 to waypoint 328. The waypoints between 324 and 328 could be paired with intermediate headings to precisely control the amount by which the heading changes at each given location between the two waypoints 324, 328. Alternatively, the difference between headings 322 and 326 can be divided by the time it will take to travel between waypoints 324 and 328, and the vessel 100 can turn at a constant rate of x degrees per unit time. In another example, the marine vessel 100 is propelled to a given waypoint in the series of waypoints after the marine vessel 100 has been rotated to the heading associated with the given waypoint. For example, ignoring the waypoints between waypoint 324 and waypoint 328, the marine vessel 100 is rotated in place at waypoint 324 from heading 322 to heading 326. The marine vessel 100 then travels from waypoint 324 to waypoint 328 at the heading 326. The user input means 112 can allow for user selection between: (a) propelling the marine vessel to a given waypoint in the series of waypoints while simultaneously rotating the marine vessel to the heading associated with the given waypoint; and (b) propelling the marine vessel to the given waypoint after rotating the marine vessel to the heading associated with the given waypoint by way of selection of a certain menu item, button, or similar on the electronic navigation device 104.

Comparing the tracks 300 and 308 shown in FIG. 3, using the method of the present disclosure for setting waypoints allows for much finer control along the track 308 than along the track 300. Fewer or more waypoints (as selected by the operator) could be provided to provide tighter or looser control along the track 308. For example, curves can be traversed by way of setting a number of waypoints that form an arc.

Figure 5:
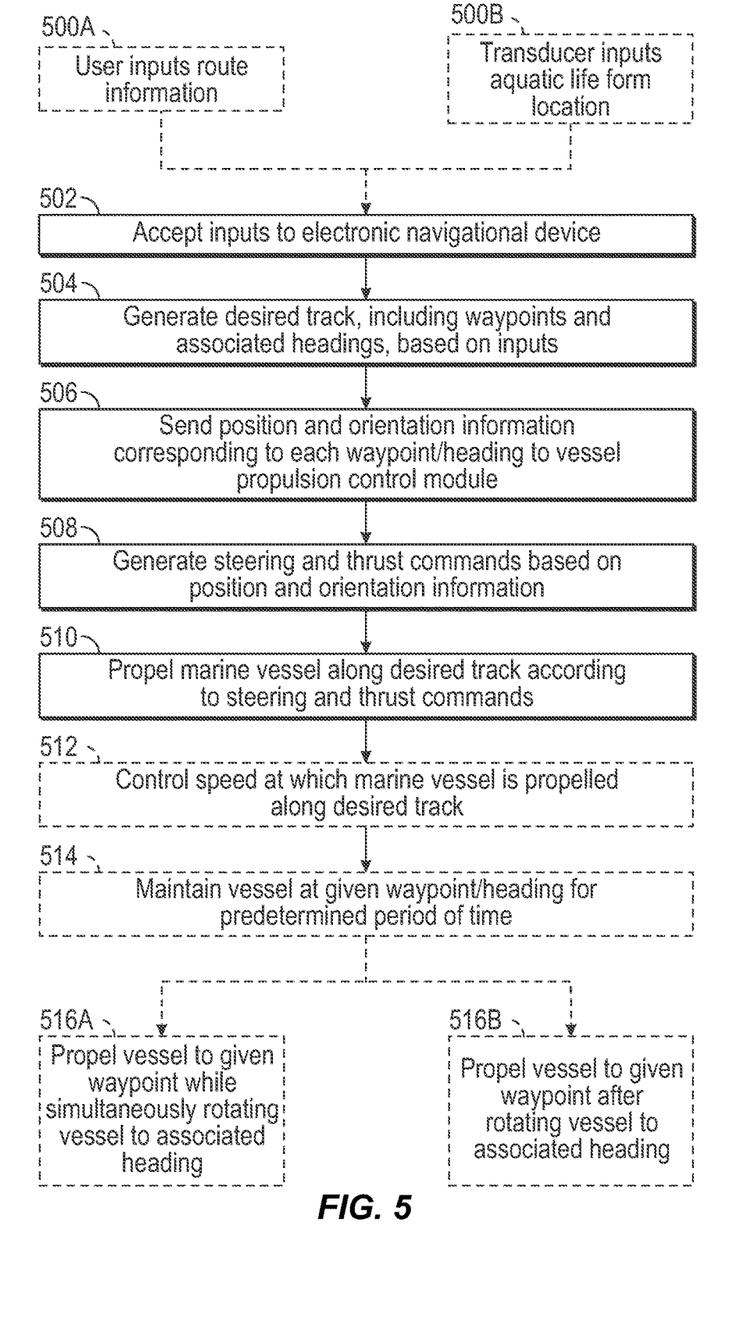
FIG. 5 illustrates an example of a method for maneuvering a marine vessel according to the present disclosure.

Turning to FIG. 5, a method for maneuvering a marine vessel 100 powered by a vessel propulsion system 108 will be described. As shown at 500A, the method may include accepting user inputs relating to a desired route on a navigational map 340. Alternatively, as shown at 500B, the method may include accepting transducer inputs related to a location of an aquatic life form, such as a fish. Next, as shown at 502, the method includes accepting inputs (whether they are user inputs or transducer inputs) to an electronic navigation device 104. As shown at 504, the method includes generating a desired track 308 based on the inputs, wherein the desired track 308 includes a series of waypoints (e.g. 312, 316, etc.), each waypoint in the series of waypoints being associated with a respective heading. (e.g., 310, 314, etc.). As shown at 506, the method includes sending position and orientation information corresponding to each waypoint and its associated heading to a control module, which may be a single control module 16 or a helm control module 126 and/or a propulsion control module 106. As shown at 508, based on the position and orientation information, the control module generates steering and thrust commands that are required to maneuver the marine vessel 100 from a current waypoint and heading in the series to a following waypoint and heading in the series. The control module does this by treating the current waypoint and heading as the actual position and heading of the vessel and the following waypoint and heading as the target waypoint and heading, and carrying out the station keeping method described herein above with respect to FIG. 1. As shown at 510, according to the steering and thrust commands, the vessel propulsion system 108 thereafter propels the marine vessel 100 along the desired track 308 to each waypoint and its associated heading in succession.

The method may also include controlling a speed at which the vessel propulsion system 108 propels the marine vessel 100 along the desired track, as shown at 512 and/or maintaining the marine vessel 100 at a given waypoint in the series of waypoints and at the heading associated with the given waypoint for a predetermined period of time, as shown at 514. The method may additionally or alternatively include propelling the marine vessel 100 to a given waypoint in the series of waypoints while simultaneously rotating the marine vessel 100 to the heading associated with the given waypoint, as shown at 516A, or propelling the marine vessel 100 to a given waypoint in the series of waypoints after rotating the marine vessel 100 to the heading associated with the given waypoint, as shown at 516B.

Thus, by presenting the waypoints in a desired track 308 as discrete station keeping anchor points delivered to the control module 16, 106, 126 at predetermined times, fine control over both the global position and heading of the vessel 100 can be used to provide fish-following and fine waypoint tracking capabilities, including tight control over the speed at which the vessel 100 traverses the desired track 308.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for maneuvering a marine vessel powered by a propulsion system, the method comprising:
    accepting inputs to an electronic navigation device;
    generating a desired track based on the inputs, wherein the desired track includes a series of waypoints, each waypoint in the series of waypoints being associated with a respective heading; and
    sending position and orientation information corresponding to each waypoint and its associated heading to a control module;
    wherein, based on the position and orientation information, the control module generates steering and thrust commands that are required to maneuver the marine vessel from a current waypoint and heading in the series of waypoints to a following waypoint and heading in the series of waypoints;
    wherein, according to the steering and thrust commands, the propulsion system thereafter propels the marine vessel along the desired track to each waypoint and its associated heading in succession; and
    wherein the method further comprises one of:
        propelling the marine vessel to a given following waypoint in the series of waypoints while simultaneously rotating the marine vessel at a given rate from the current heading to the heading associated with the given following waypoint; or
        propelling the marine vessel to a given following waypoint in the series of waypoints after rotating the marine vessel in place at the current waypoint to the heading associated with the given following waypoint.

2. The method of claim 1, further comprising controlling a speed at which the propulsion system propels the marine vessel along the desired track.

3. The method of claim 2, further comprising sending the position and orientation information corresponding to each waypoint and its associated heading in succession at a predetermined time interval.

4. The method of claim 2, further comprising sending the position and orientation information for the following waypoint and heading only after reaching the current waypoint and heading.

5. The method of claim 2, further comprising sending the position and orientation information for the following waypoint and heading only after coming within a given distance of the current waypoint and heading.

6. The method of claim 1, wherein the inputs are user inputs relating to a desired route on a navigational map.

7. The method of claim 1, wherein the inputs are transducer inputs related to a location of an aquatic life form.

8. The method of claim 1, further comprising maintaining the marine vessel at a given waypoint in the series of waypoints and at the heading associated with the given waypoint for a predetermined period of time.

9. The method of claim 1, wherein the heading associated with the given following waypoint is not equal to a bearing between the current waypoint and the given following waypoint.

10. A navigational system for a marine vessel, the navigational system comprising:
    an electronic navigation device;
    a control module in signal communication with the electronic navigation device; and
    a vessel propulsion system in signal communication with the control module;
    wherein the electronic navigation device generates a desired track including a series of waypoints, each waypoint in the series of waypoints being associated with a respective heading;
    wherein the control module receives position and orientation information corresponding to each waypoint and its associated heading from the electronic navigation device;
    wherein, based on the position and orientation information, the control module directs the vessel propulsion system to propel the marine vessel along the desired track to each waypoint and its associated heading in succession; and
    wherein the control module uses a proportional, integral, and derivative control algorithm to determine steering and thrust commands that null a position error between a current waypoint and a following waypoint in the series of waypoints and that null a heading error between a current heading associated with the current waypoint and a following heading associated with the following waypoint, and directs the vessel propulsion system according to the steering and thrust commands.

11. The navigational system of claim 10, wherein the electronic navigation device comprises a display screen and user input means.

12. The navigational system of claim 11, wherein the electronic navigation device is a combined fish finder and chart plotter.

13. The navigational system of claim 12, wherein the electronic navigation device generates the desired track based on a desired route on a navigational map displayed on the display screen.

14. The navigational system of claim 13, further comprising a global positioning system receiver that is part of or is in signal communication with the electronic navigation device.

15. The navigational system of claim 12, wherein the electronic navigation device generates the desired track based on a location of an aquatic life form.

16. The navigational system of claim 15, further comprising a transducer assembly for detecting the aquatic life form, wherein the transducer assembly is in signal communication with the electronic navigation device.

17. The navigational system of claim 11, wherein the user input means allows for user control over a speed at which the marine vessel is propelled along the desired track.

18. The navigational system of claim 11, wherein the user input means allows for user selection between: (a) propelling the marine vessel to a given waypoint in the series of waypoints while simultaneously rotating the marine vessel to the heading associated with the given waypoint; or (b) propelling the marine vessel to the given waypoint after rotating the marine vessel to the heading associated with the given waypoint.

* * * * *